United States Patent [19]

Erway et al.

[11] Patent Number: 5,782,006
[45] Date of Patent: Jul. 21, 1998

[54] DOWELING JIG

[75] Inventors: Parker Erway, Battle Creek; Dick Zeigler, Hastings, both of Mich.; James Brown, 810 Indian Hills Dr., Hastings, Mich. 49058

[73] Assignee: James Brown, Hasting, Mich.

[21] Appl. No.: 741,820

[22] Filed: Oct. 31, 1996

[51] Int. Cl.$^6$ ............................. G01D 21/00; B25B 1/10
[52] U.S. Cl. ............................. 33/520; 33/644; 269/242; 408/115 R
[58] Field of Search ............................. 33/194, 197, 520, 33/533, 613, 628, 638, 644, 645, 670, 671, 673; 408/115 R, 115 B; 269/240, 241, 242

[56] References Cited

U.S. PATENT DOCUMENTS

| | | | |
|---|---|---|---|
| 612,391 | 10/1898 | Ballou | 269/241 |
| 1,008,926 | 11/1911 | Saylor | 269/242 |
| 2,211,634 | 8/1940 | Baker | 77/62 |
| 2,602,238 | 7/1952 | Wellman | 408/115 R |
| 2,842,860 | 7/1958 | Gray | 33/191 |
| 3,026,748 | 3/1962 | Comorau | 77/62 |
| 3,807,889 | 4/1974 | Kiezel | 408/108 |
| 4,981,400 | 1/1991 | Stover | 408/115 |
| 5,308,199 | 5/1994 | Juang | 408/115 R |
| 5,407,306 | 4/1995 | Klapperich | 408/115 |

FOREIGN PATENT DOCUMENTS

| | | | |
|---|---|---|---|
| 0009822 | of 1905 | United Kingdom | 269/241 |
| 0024993 | of 1910 | United Kingdom | 269/241 |
| 0641592 | 8/1950 | United Kingdom | 269/242 |

OTHER PUBLICATIONS

Photographs (3) of a prior art dowling jig sold more than a year before Oct. 31, 1996.

Primary Examiner—Daniel G. DePumpo
Attorney, Agent, or Firm—VanDyke, Gardner, Linn & Burkhart, LLP

[57] ABSTRACT

A centering jig assembly for centering guide holes for a drill provides an improved adjustment feature, which avoids reliance on fasteners to fix the position of the screw device with respect to the clamp jaws. The jig assembly includes a first holding element having a first threaded bore extending therethrough and a first bearing face bearing against a first engagement surface of a work piece and a second holding plate member having a second bearing surface and a second bore extending therethrough for alignment with the first bore, the second bearing surface bearing against a second engagement surface of the work piece. A center axis of the first bore and a center axis of the second bore are collinear defining an axis of travel. The first and second plates are adapted to translate generally parallel with respect to each other along the axis of travel. The guide members interpose between the first and second holding plate members, with the guide member having a first guide surface and second guide surface, at least one guide hole extending from the first guide surface to the second guide surface. The second guide surface abuts the drilling surface of the work piece so that the first guide hole can be aligned on the surface of the work piece. A rod is provided extending through and adapted to engage the first and second bores of the first and second holding plate members such that rotational movement of the rod urges the first and second holding plate members along the axis of travel in opposite directions toward or away from the guide member. The rod includes a removable bushing for engaging one of the first and second bores.

22 Claims, 4 Drawing Sheets

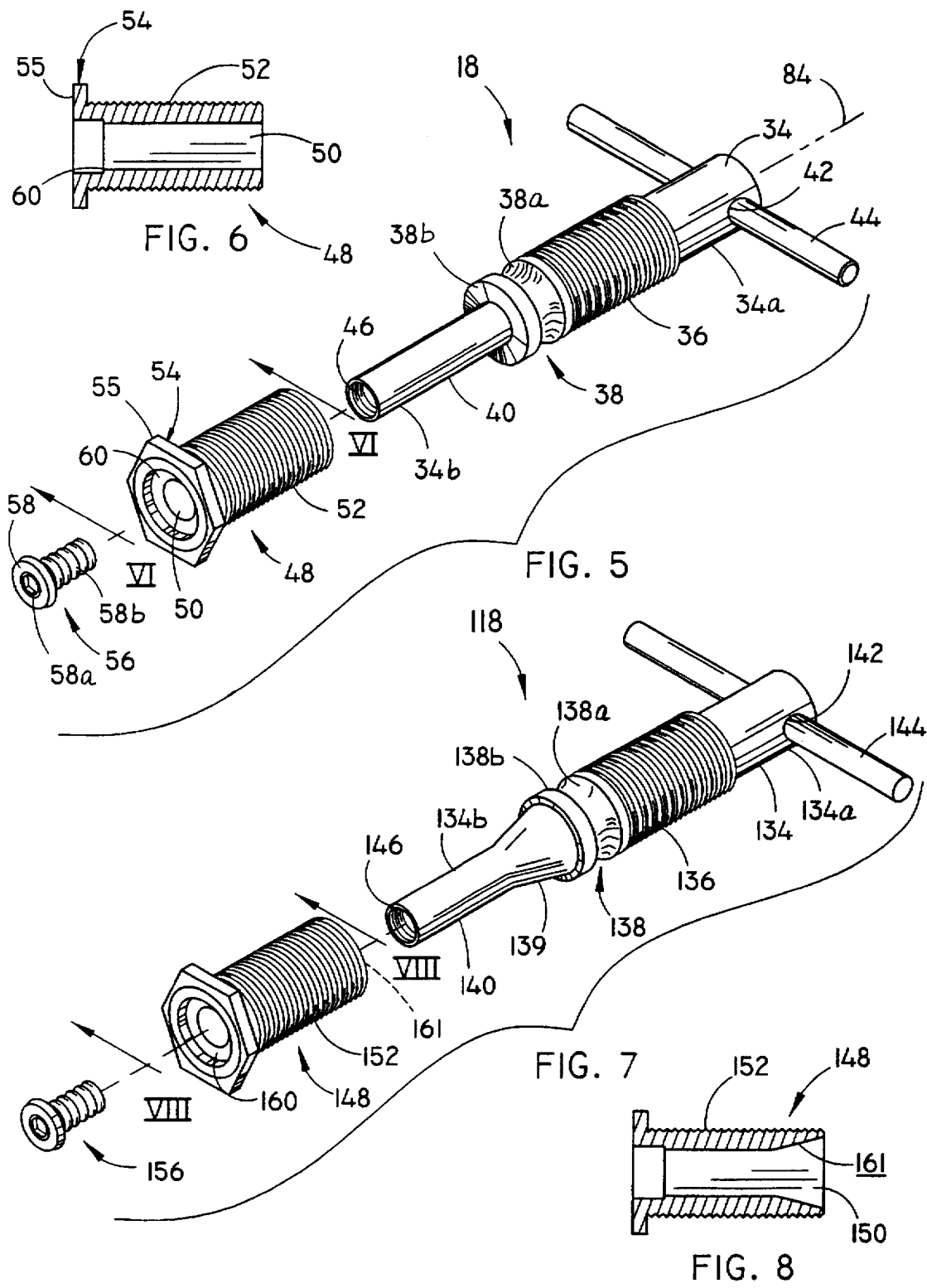

DOWELING JIG

FIELD OF THE INVENTION

The present invention relates to a jig and, more particularly, to a doweling jig for aligning a drill for boring holes in a work piece, such as board or the like, and for centering the drill on the work piece.

BACKGROUND OF THE INVENTION

In preparing a pair of boards to be joined by dowels, it is essential to locate the dowel holes accurately and to drill the holes orthogonally to the drilling face of the work piece so that the boards are accurately aligned and registered together by dowels that are to be inserted into the dowel holes. Moreover, by centering dowel holes on the work piece, the joint capacity of the joined boards is maximized.

Manually locating such holes is dependant on the skill and care of the individual carpenter; therefore, variations typically occur from one carpenter to another carpenter. Numerous template or marking devices have been developed to assist carpenters in locating various holes, for example holes for drawer handle fasteners and dowel holes. Though these templates or marking devices provide some level of increased consistency, their use still depends on manual adjustment of the template or marking device on the work piece and the skill of the individual carpenter to drill the holes orthogonally with respect to the work piece drilling surface.

In U.S. Pat. No. 2,842,860 to Gray, an automatic centering device is disclosed for drilling holes in a front face of a drawer. The centering device includes a template and a support bracket adapted to receive the top edge portion of a drawer and horizontally extending arms engaging opposite sides of the drawer. Movement of one arm causes automatic movement of the other arm, such that the device automatically centers the template on the face of the drawer between the two sides of the drawer. Selected openings are provided in the template through which a punch can be inserted to mark the location where holes are to be drilled or where self-tapping screws are to be screwed into the drawer. While this device removes the manual aspect in locating the hole, the template of the centering device does not provide a guide to assist in the orthogonality of the drilled holes or the self-tapping threaded fasteners. Furthermore, the device is relatively complicated to assemble.

Other devices include jig assemblies such as those disclosed in U.S. Pat. No. 2,211,634 to Baker and U.S. Pat. No. 3,026,748 to L. Comorau. The Baker device consists of a guide block slidably mounted on two orthogonal pairs of spaced guide rods. Each pair of guide rods include a pair of lugs disposed at one end thereof for engaging a respective side of the work piece. Set screws are provided to hold the rods in the guide block when the lugs have been aligned with the respective edges of the work piece to position the guide block on the work piece.

Comorau '748 discloses a jig assembly that is conceptually similar to Baker but one that is more complicated. Comorau's device includes a guide block slidably mounted on two orthogonal pairs of spaced guide rods. The guide rods are releasably mounted at one end in a first pair of setting blocks and releasably secured at the other end in a second pair of setting blocks. Each of the setting blocks provide gripping faces for holding the work piece therebetween. Each of the second pair of setting blocks include a micrometer having a spindle extending therethrough for engaging the guide block to adjust the position of the respective second setting block along the guide rods with respect to guide block. Set screws fix the position of the respective setting blocks along the guide rods and, in turn, fix the position of the guide block with respect to the work piece. The Baker and Comorau devices are relatively complicated and difficult to use, requiring several steps to set the position of the guide block on the work piece and numerous fasteners to secure the guide rods in place.

In U.S. Pat. No. 3,807,889 to Kiezel, a self-centering jig is disclosed, which includes a pair of channels and a pair of spaced apart pivotal cross members interconnecting the channels. A screw clamp extends through both channels to adjust the distance between the two channels, which induces the cross members to expand or contract in unison. The pivotal centers of each of the cross members include a transverse bore through which a drill bit can be guided and centered on the edge portion of a work piece, which is held between the two channels. Kiezel's device, however, does not provide a guide that improves the orthogonality of the drilled holes. Again, the jig is relatively complicated to assemble.

Therefore, there is a need for a centering device that is relatively simple to assemble and use and provides accurate location of holes and guides a drill bit generally orthogonally to the drilling surface of the work piece.

SUMMARY

Accordingly, the present invention provides a new and unique jig for centering a drill, which is especially suited for centering a drill bit on a work piece for drilling dowel holes or the like. The jig is centered on the work piece by an improved centering device that is simple to use and assemble.

In one aspect of the invention, the jig includes a pair of holding members and a guide member interposed between the holding members. The guide member includes at least one guide bore extending therethrough for guiding and centering a drill on the work piece. A rod extends through first and second bores of the holding members and through a rod receiving passage of the guide member and is adapted to engage the first and second bores and the guide member such that rotational movement of the rod induces translational movement of the holding elements along the rod defining an axis of travel. The rod includes a removable threaded bushing for engaging one of the first and second bores of the holding members. In another aspect, the rod includes a shoulder, and the bushing includes a shoulder cooperating with the shoulder of the rod such that when said the bushing is coupled to rod, the respective shoulders of the bushing and the rod align the bushing on the rod.

In other aspects, the rod includes a threaded portion engaging the first bore of a first of the holding members for adjusting the position of the first holding member along the axis of travel and is adapted to rotate in the guide member but to be restricted from movement therethrough. The threaded bushing engages the second bore for adjusting the position of the second holding member along the axis of travel. In one aspect, the threaded bushing includes a stop to limit the travel of the second holding member along the bushing.

In another aspect of the invention, the jig includes a first and second holding elements, a guide member interposed between the first and second holding elements, a rod member having a threaded portion for engaging a first threaded bore in the first holding element and a shaft portion having a threaded bore. The rod member is rotatably coupled to the guide member. A bushing is releasably coupled to the rod member and includes a rod receiving bore and a threaded portion. The rod receiving bore receives the shaft portion of the rod member, and the threaded portion of the bushing aligns with the threaded portion of the rod member and engages the second threaded bore of the second holding element. The threaded portions of the rod and bushing adjust the position of the first and second holding elements along the rod and bushing to center the guide member on the work piece.

In one aspect, a fastener secures the bushing to the rod member for rotatably coupling the bushing to the rod member. In other aspects, the bushing includes a transverse bore defining the rod receiving bore. The fastener extends into the transverse bore for securing the bushing to the rod member. In another aspect, the bushing includes a shoulder positioned in the transverse bore, and the fastener engages the shoulder for securing the bushing to the rod member. In further aspects, the shaft portion of the rod member includes a shoulder, and the transverse bore of said bushing includes a shoulder cooperating with the shoulder of the rod member such that when the fastener is tightened the shoulder of the bushing engages the shoulder of the rod member to align the bushing on the rod member.

In yet another aspect, a centering device for a jig assembly includes a rod having a threaded portion for engaging a threaded bore of a first clamping jaw of the jig assembly for adjusting the position of the first clamping jaw along the centering device. The rod includes an annular recess for cooperating with a guide member of the jig assembly for restricting the longitudinal movement of the centering device through the guide member. The rod further includes a shaft portion. A bushing is releasably coupled to the rod and includes a bore for receiving the shaft portion of the rod and a threaded portion for engaging a threaded bore of a second clamping jaw of the jig assembly for adjusting the position of the second clamping jaw along the centering device with respect to the guide member.

In other aspects, a fastener extends into the bore of the bushing and couples to the shaft portion of the rod for coupling the bushing to the rod. In one aspect, the bore of the bushing includes an alignment surface, and the shaft portion includes an alignment surface cooperating with the alignment surface of the bushing to align the bushing on the rod when the bushing is coupled to the rod.

These and other objects, advantages, purposes and features of the invention will become more apparent from a study of the following description taken in conjunction with the drawings.

BRIEF DESCRIPTION OF THE DRAWINGS

FIG. 5 is an exploded perspective view of the centering device of the doweling jig of FIG. 1;

FIG. 6 is a cross-sectional view of the bushing taken along line VI—VI of FIG. 5;

FIG. 7 is an exploded perspective view of an alternate embodiment of the centering device; and FIG. 8 is a cross-sectional view of the bushing of the alternate embodiment of the centering device taken along line VIII—VIII of FIG. 7.

These and other objects, advantages, purposes and features of the invention will become more apparent from a study of the following description taken in conjunction with the drawings.

DETAILED DESCRIPTION OF THE PREFERRED EMBODIMENTS

Figure 1:
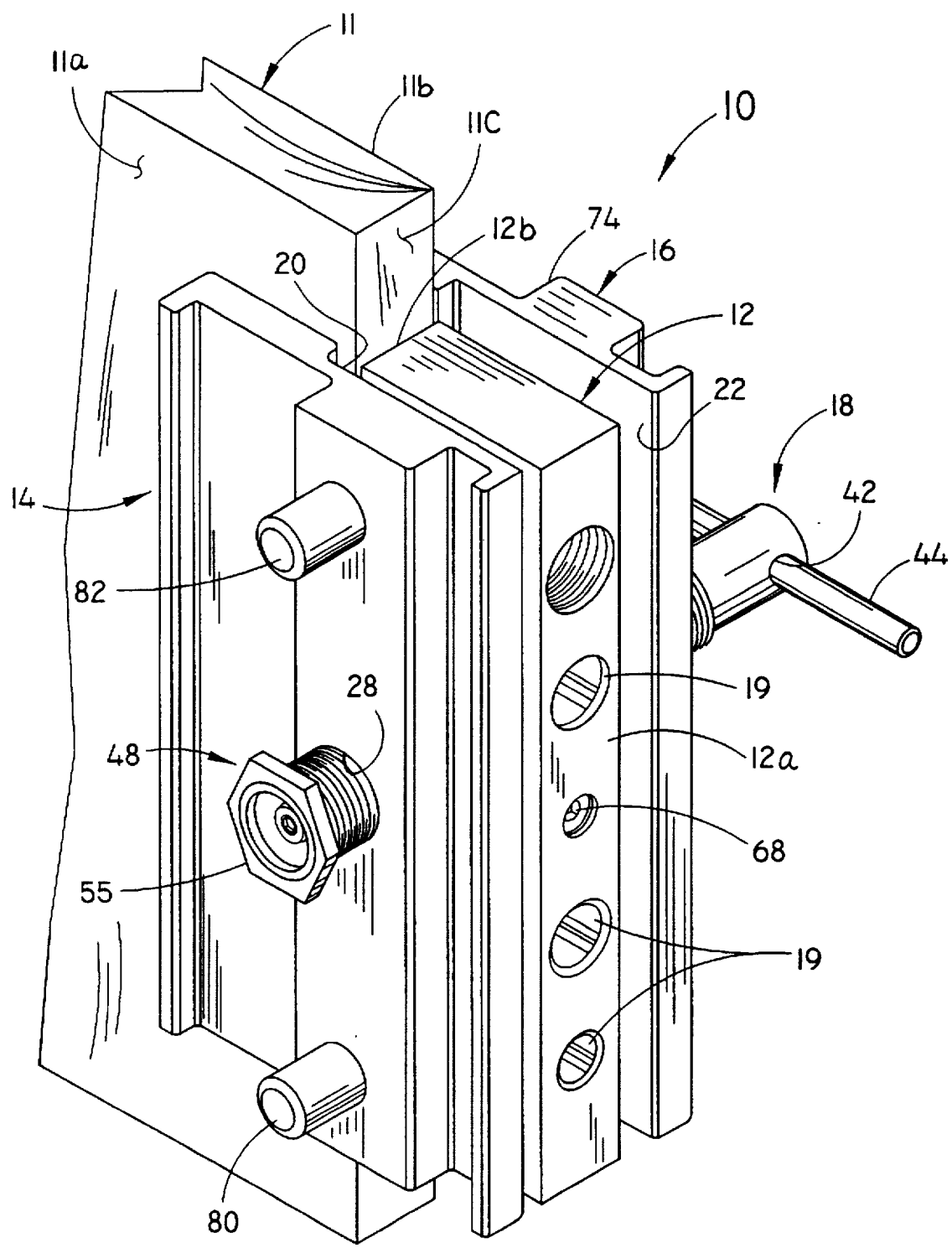
FIG. 1 is a perspective view of a doweling jig of the present invention mounted on a work piece.

Referring to FIG. 1, a jig assembly 10 of the present invention is shown mounted on a work piece 11 having parallel spaced apart sides 11a and 11b. Jig assembly 10 includes a guide member 12, which is mounted adjacent a drilling surface 11c of work piece 11 by a pair of spaced apart clamp jaws 14 and 16 and centered on drilling surface 11c, between spaced apart sides 11a and 11b, by a threaded centering device 18.

Preferably, guide member 12 includes a plurality of parallel longitudinally extending bores 19 that extend from an upper end 12a to a lower end 12b of the guide member 12 toward drilling surface 11c. Bores 19 range in size to provide a plurality of guide bores to accommodate drill bits with varying diameters for drilling dowel holes or screwing threaded fasteners or the like, which are to be drilled or inserted into work piece 11. Each bore 19 may vary in dimension from each of the other bores to provide a wide range of drill bit guides in the jig assembly 10. Furthermore, bores 19 may be threaded. Guide member 12 is supported on centering device 18 between recessed guide facing surfaces 20 and 22 of clamp jaws 14 and 16. Guide facing surfaces 20 and 22 are generally planar and are formed above generally planar bearing surfaces 24 and 26 of clamp jaws 14, 16, which engage the sides 11a and 11b of work piece 11. Planar bearing surfaces 24 and 26 are brought into bearing contact with the spaced apart sides 11a and 11b of work piece 11 by centering device 18.

Figure 2:
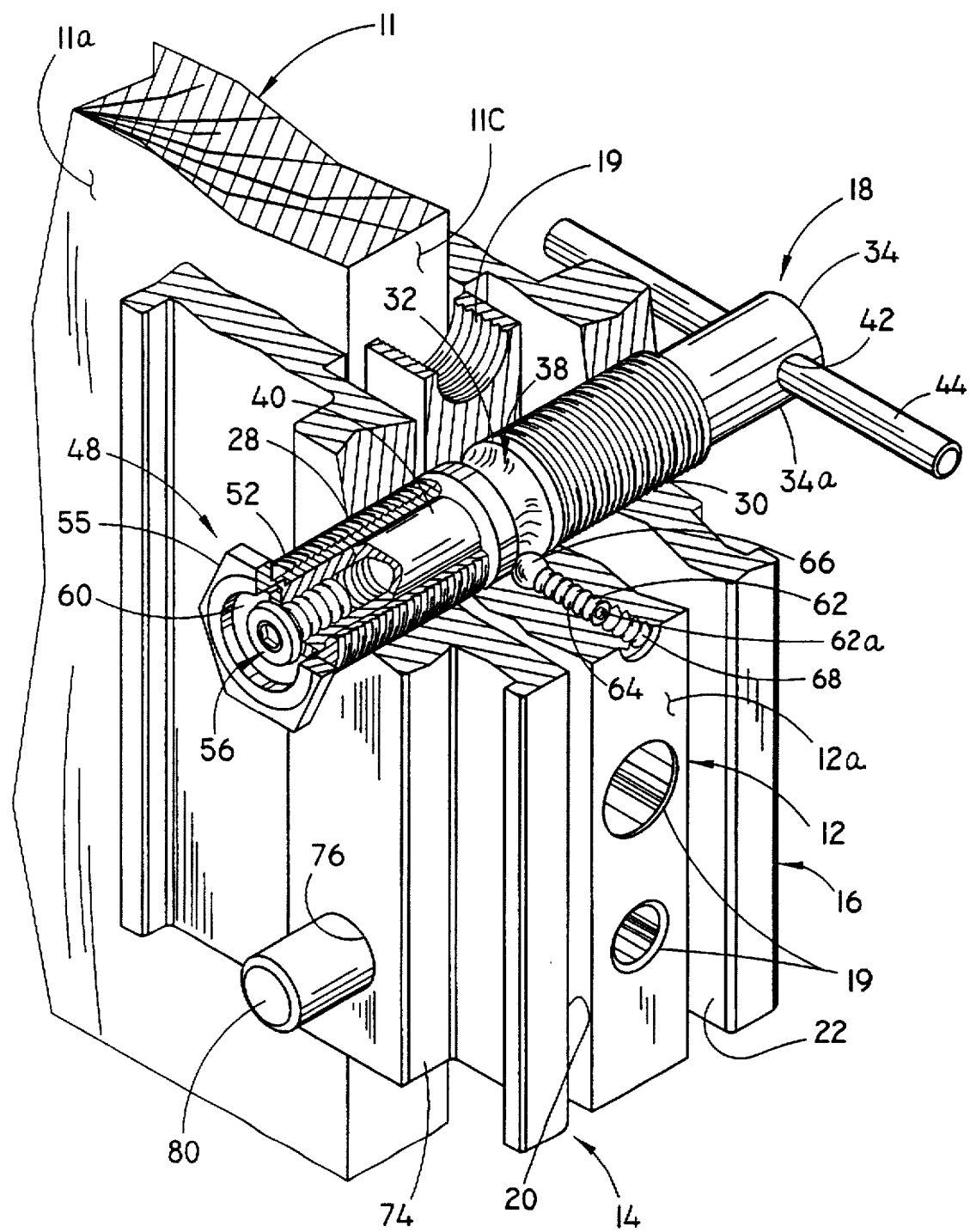
FIG. 2 is a partial-cut away perspective view of the jig illustrating the cooperation between a pair of clamping jaws, a guide member, and a centering device.

As best seen in FIG. 2, centering device 18 extends through and engages threaded bores 28 and 30 of clamp jaws 14 and 16 and extends through a transverse bore 32 of guide member 12. Transverse bore 32 receives and cooperates with a central portion of centering device 18 to permit rotational movement of centering device 18 within bore 32 but to restrict lateral movement of centering device 18 therethrough, as will be explained below in more detail. In this manner centering device 18 centers guide member 12 and the respective bores 19 on drilling surface 11c of work piece 11 by cooperating with guide member 12 and the respective clamps jaws 14,16 in a manner that induces simultaneous translation movement of the clamp jaws 14 and 16 along the centering device 18 when the centering device 18 is turned. As centering device 18 is turned, clamp jaws 14 and 16 grip work piece 11 therebetween while maintaining the spacing between guide member 12 and the respective clamp jaws 14, 16 relatively equal.

As best seen in FIG. 5, threaded centering device 18 comprises a rod member 34 having a threaded portion 36 for engaging threaded bore 28, a cooperating structure 38, such as an annular recess 38a or the like, and a shaft portion 40, which extends from cooperating structure 38 from shoulder 38b of cooperating structure 38. A first end portion 34a of the rod member 34 includes a transverse hole 42 through which a pin 44 projects to provide a handle so that centering device 18 can be manually rotated. A second end portion 34b of rod member 34 includes a threaded bore 46, which extends into shaft portion 40, for receiving a fastener, as will be explained below.

Centering device 18 also includes a cooperating collar/bushing member 48. Bushing member 48 includes a longitudinal bore 50 extending therethrough for receiving shaft portion 40 of rod member 34. Bushing 48 further includes a threaded portion 52 on its exterior surface, which preferably aligns with threaded portion 36 of rod member 34. Threaded portion 48 engages threaded bore 30 of clamping jaw 14 to induce translational movement of clamping jaw 14 along centering device 18 as will be more fully described below. Bushing 48 mounts on shaft portion 40 of rod member 34 and is secured thereto by a fastener 56. Fastener 56 preferably includes an enlarged head 58 having a engagement structure 58a, such as an allen wrench socket or the like, and a threaded portion for engaging threaded bore 46 of shaft 40. Fastener 56 inserts into bore 50 of bushing member 48, and head 58 engages a shoulder 60 provided in bore 50 of bushing member 48 so that when threaded portion 58b is engaged with threaded bore 46 of shaft portion 40, fastener 56 secures bushing member 48 to rod member 34. In this manner, fastener 56 couples bushing member 48 to rod member 34 so that threaded portions 36 and 52 are aligned and rotate in unison.

As best seen in FIG. 2, centering device 18 extends through bore 28 of clamp jaw 14, bore 32 of guide member 12, and bore 30 of clamp jaw 16 and is restrained from lateral movement through guide member 12 by a threaded rod member 62, which extends into guide member 12 to engage centering device 18. Threaded rod member 62, which includes a threaded portion 64 and a bearing end portion 66, is positioned in a threaded passageway 68 formed in guide member 12 to stop the lateral/transverse movement of centering device 18 therethrough. The position of threaded rod member 62 may be adjusted by threading rod member 62 in and out of passageway 68 by a tool. Preferably, rod member 62 includes a tool receiving structure 62a, such as an alien wrench socket or screw driver recess. Passageway 68 extends from upper surface 12a of guide member 12 to bore 32 of guide member 12, so that threaded rod member 62 may be selectively extended through passageway 68 to position end portion 66 to engage cooperating structure 38 of rod member 34. Preferably, cooperating structure 38 includes an annular recess 38a to receive bearing end portion 66. Preferably, bearing end portion 66 comprises a spherical structure that engages annular recess 38a, which permits rotational movement of centering device 18 in guide member 12 but restricts lateral movement of the centering device 18 therethrough. In this manner, when centering device 18 is turned both plate members 14 and 16 are simultaneously translated along centering device 18 away from or toward guide member 12.

Preferably, threaded portions 36 and 52 are threaded in opposite directions, for example, threaded portion 36 may include right hand threads while threaded portion 52 of rod member 34 includes left hand threads. On the other hand, threaded portion 52 may include left hand threads while threaded portion 36 of rod member 34 includes right hand threads. Furthermore, threaded portions preferably are threaded with approximately the same pitch. Therefore, when centering device 18 is extended through both clamping jaws 14 and 16, rotational movement of centering device 18 imparts comparable translational movement to both plate members 14, 16 along centering device 18 but in opposed directions. To limit the lateral movement of clamp jaw 14 along centering device 18, bushing 48 includes an enlarged end 54 that abuts clamp jaw 14 when centering device 18 is fully turned. Likewise, pin 44 provides a stop for clamp jaw 16, so that neither clamp jaws 14, 16 may come unintentionally disengaged from centering device 18.

As best seen in FIG. 5, enlarged end portion 54 may be formed in the shape of a nut 55, so that in addition to providing a stop to limit lateral movement of plate member 14, enlarged end 54 provides a holding surface so that when fastener 56 is torqued to engage threaded bore 46 of shaft portion 40 bushing 48 can be held stationary.

Referring to FIG. 7, an alternative embodiment of centering device 118 includes a rod member 134 having a threaded portion 136 for engaging threaded bore 28 of clamp jaw 16, a cooperating structure 138, such as an annular recess 138a or the like, and a shaft portion 140, which extends from cooperating structure 138. In a similar manner to the first embodiment, rod member 134 includes a transverse hole 142 at a first end portion 134a through which a pin 144 extends to provide a handle. A second end portion 134b of rod member 134 includes a threaded bore 146 extending into shaft portion 140 for receiving a fastener 156.

Centering device 118 also includes a cooperating bushing member 148, which includes a threaded portion 152 for engaging threaded bore 30 of clamp jaw 14 and a longitudinal bore 150 for receiving shaft portion 140 of rod member 134. Longitudinal bore 152 includes a shoulder 161, which cooperates with a corresponding shoulder 139 provided on shaft portion 140. Bushing 148 mounts on shaft portion 140 of rod member 134 and is secured thereto by a fastener 156 and aligned thereon by shoulders 161 and 139 which cooperate together to align threaded portions 152 and 136. Preferably, shoulder 139 is positioned adjacent an annular recess shoulder 138b of cooperating structure 138 and extends around shaft portion 140 to cooperate with shoulder 161.

As best seen in FIGS. 7 and 8, shoulders 139 and 161 are preferably tapered to provide smooth camming surfaces. When bushing 148 is secured to shaft portion 140 of rod member 134 by threaded fastener 156, shoulder 161 engages shoulder 139 to align threaded portion 152 of bushing 148 with respect to threaded portion 136 of rod member 134. It should be understood that shoulders 139 and 161 may comprise any geometric surface which cooperate together to align threaded portion 152 of bushing 148 and threaded portion 136 of rod 134.

Referring to FIGS. 1-4, clamping jaws 14 and 16 are preferably formed from metal plate members having generally planar bearing services 24 and 26 and recessed guide member receiving surfaces 20 and 22 on inwardly facing sides and loading surfaces 70 and 72 on outwardly facing sides. Bearing surfaces 24 and 26 are preferably offset from guide facing surfaces 20 and 22 so that the width of the guide member 12 does not limit the width of work piece 11. Loading surfaces 70 and 72 each include an abutment 74, which provides stiffness and increased cross-sectional properties to clamping jaws 14 and 16. Bores 28 and 32 are aligned along abutment 74 so that the compression forces exerted by the centering device 18 or 118 are applied to the portion of clamping jaws 14, 16 with the greatest cross-sectional properties, which reduces stress in the jig. Furthermore, by aligning the centering device 18 or 118 on the portion of the clamping jaws 14, 16 with the greatest stiffness, the forces are more uniformly applied to the work piece through bearing surfaces 24 and 26 of clamping jaws 14 and 16.

In order to maintain clamping jaws 14 and 16 generally parallel while clamping jaws 14 and 16 are translated along centering device 18 or 118 and while they are clamped down on work piece 11, clamping jaws 14 and 16 are provided with a pair of guide holes 76 and 78 and a pair of guide pins 80 and 82 extending through guide holes 76 and 78, respectively. Guide pins 80 and 82 provide alignment of clamp jaws 14 and 16 and guide clamp jaws 14 and 16 to move generally parallel with respect to each other as they translate along longitudinal axis 84 of centering device 18 or 118. Preferably, guide holes 76 and 78 are positioned along abutment 74, which provides increased bearing contact with pins 80 and 82 and, therefore, improves the ability of pins 80 and 82 to maintain the parallelism between clamp jaws 14 and 16.

Figure 3:
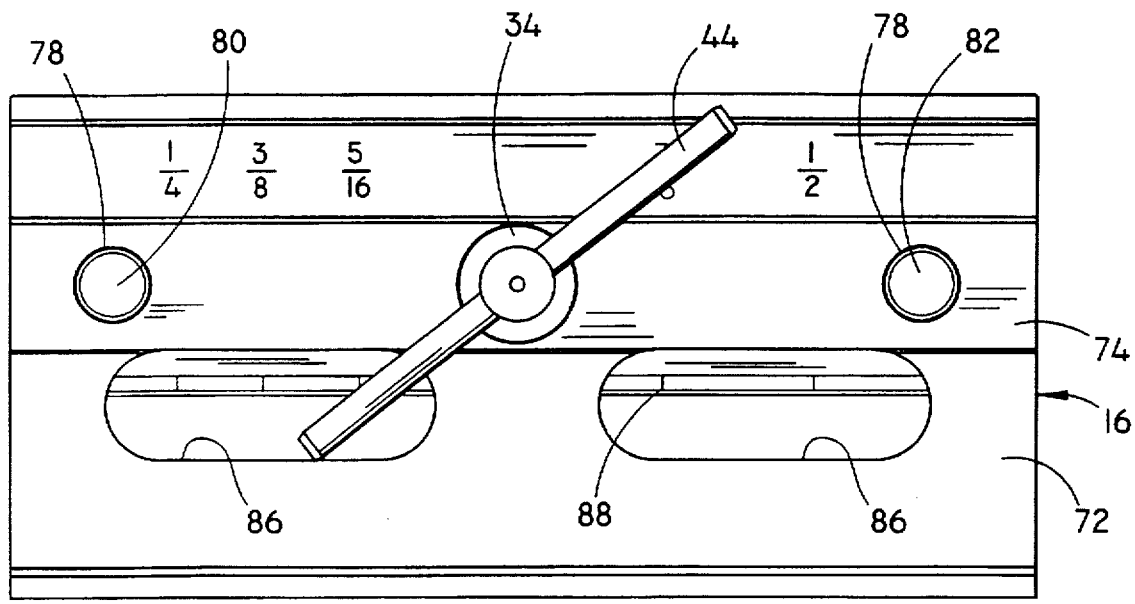
FIG. 3 is a front elevational view of the doweling jig.
Figure 4:
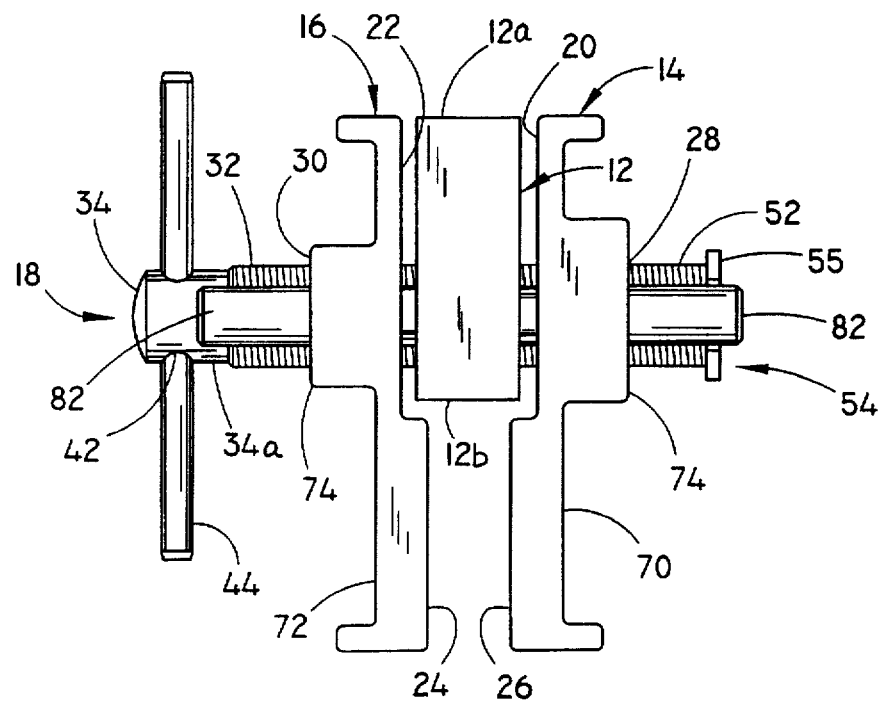
FIG. 4 is a side elevational view of the doweling jig.

Furthermore, at least one clamping jaw 16 is provided with sight openings 86 so that the guide member can be accurately aligned along the edge of the work piece 11. As best seen in FIG. 3, guide member 12 may include a plurality of indicia 88, which correspond to the center lines of the respective bores 19. Indicia 88 can be viewed through sight openings 86 to assist in the alignment of guide member 12 on work piece 11.

To assemble jig 10, threaded portion 36 or 136 of rod member 34 or 134 is threaded into threaded bore 30 of clamp jaw 16 and shaft portion 40 or 140 of rod member 34 or 134 is projected through bore 32 of guide member 12 to align annular recess 38a or 138a with threaded passageway 68 of guide member 12. Once aligned, threaded rod member 62 is threaded into passageway 68, using a tool such as an allen wrench, to position ball structure 66 in annular recess 38a or 138a of rod member 34 or 134 and, thereby, fix rod member 34 or 134 in guide member 12. At this point, rod member 34 or 134 may be turned to translate clamp jaw 16 along threaded portion 36 or 136 until guide facing surface 22 abuts guide member 12. Bushing 48 or 148 is then threaded through threaded bore 28 of clamp jaw 14 and slid over shaft portion 40 or 140 of rod member 34 or 134 in an abutting relationship with shoulder 38b or 138b of annular recess 38a or 138a. Preferably, bushing 48 or 148 is then rotated until guide facing surface 20 of clamp jaw 14 abuts the other side of guide member 12 so that clamp jaws 14 and 16 are positioned at approximately equally spaced locations with respect to guide member 12. While enlarged end is held by a tool, for example a wrench or pliers, fastener 56 or 156 is inserted into bore 50 or 150 and into threaded bore 46 or 146 of shaft portion 40 or 140 and torqued by a tool, for example an allen wrench or screw driver. In this manner, bushing 48 or 148 is releasably coupled to rod member 34 or 134, thereby aligning threaded portions 36 or 136 and 52 or 152 to fashion a threaded centering device 18 or 118 with opposed hand threads on either end of the centering device. It can be appreciated that the assembly of jig 10 is simple and relatively quick.

While several forms of the invention have been shown and described, other forms will now be apparent to those skilled in the art. The embodiments of the invention shown in the drawings are not intended to limit the scope of the invention which is defined by the claims which follow.

The embodiments of the invention in which we claim exclusive property or privilege are defined as:

1. A jig for centering a drill on a work piece, the work piece having first and second engagement surfaces and a drilling surface, said jig comprising:

a first holding member having a first bearing surface and a first threaded bore extending therethrough, said first bearing surface for bearing against the first engagement surface of the work piece;

a second holding member having a second bearing surface and a second threaded bore extending therethrough aligning with said first threaded bore, said second bearing surface for bearing against the second engagement surface of the work piece, said first and second threaded bores aligned along an axis defining an axis of travel, said first and second holding members adapted to translate generally parallel with respect to each other along said axis of travel;

a guide interposed between said first and second holding members, said guide having a transverse rod receiving passage and at least one guide hole extending therethrough for guiding a drill bit onto the drilling surface of the work piece; and a threaded rod having threads spaced along said rod at a first spacing in a threaded zone and being free of threads in a second non-threaded zone, said threaded rod extending through said first and second threaded bores of said holding members and said rod receiving passage of said guide, said threaded rod being longitudinally fixed in said rod receiving passage and engaging one of said first and second threaded bores such that rotational movement of said threaded rod urges one of said first and second holding members along said axis of travel in a first direction from said guide, said threaded rod including a removable threaded collar selectively rotatable disposed on said second non-threaded zone and having threads spaced along said collar at said first spacing and an enlarged distal end, said threaded collar engaging the other said first and second bores and said threaded rod including a fastener selectively fixing said threaded collar on said second non-threaded zone so as to rotate therewith, wherein one of said threaded rod and said threaded collar includes right hand threads and the other of said threaded rod and said threaded collar includes left hand threads, such that when said rod is rotated said first and second holding members move generally simultaneously toward or away from each other along said rod, and said enlarged distal end providing a stop to limit movement of said other of said first and second holding members along said collar.

2. A jig according to claim 1, wherein said enlarged distal end comprises a nut thereby providing a holding surface on said threaded collar.

3. A jig according to claim 1, wherein said threaded collar has a rod receiving bore and includes a shoulder, and said second non-threaded zone includes a shoulder cooperating with said shoulder of said rod receiving bore to align said threaded collar with said threaded zone of said threaded rod.

4. A jig according to claim 3, wherein said rod receiving bore includes an alignment surface, and said shaft portion includes an alignment surface cooperating with said alignment surface of said rod receiving bore to align said threaded collar with said threaded rod.

5. A jig according to claim 1, further comprising a fastener, said fastener coupling said threaded collar to said rod.

6. A jig according to claim 5, wherein said threaded collar includes a shaft receiving bore extending therethrough, and said rod includes a shaft portion having a threaded bore, said fastener extending into said rod receiving bore and engaging said threaded bore of said shaft portion for securing said threaded collar to said rod.

7. A jig according to claim 6, where in said shaft receiving bore of said threaded collar includes shoulder, said fastener engaging said shoulder for securing said threaded collar to said rod.

8. A jig according to claim 1, wherein said rod includes a cooperating structure and said guide includes a pin passageway extending into said rod receiving passage, said jig further comprising: a positioning pin extending through said pin passageway to engage said cooperating structure, said positioning pin restricting transverse movement of said rod through said guide.

9. A jig according to claim 8, wherein said positioning pin includes a bearing at a distal end thereof, and said cooperating surface comprises an annular recess receiving said bearing such that said bearing slidably engages said annular recess and stops said centering device from longitudinal movement through said guide.

10. A jig according to claim 9, wherein said positioning pin comprises a threaded pin, said guide including a threaded passage extending into said rod receiving passage, said threaded pin received in said threaded passage for selectively positioning said bearing in said rod receiving passage to engage or disengage from said annular recess.

11. A jig according to claim 1, said first holding member including a first pair of spaced apart guide holes, said second holding member including a second pair of spaced apart guide holes aligning with said first pair of guide holes, said jig further comprising:

a first pin extending through a first guide hole of each of first and second holding members; and a second pin extending through a second guide hole of each of said first and second holding members, such that said pins guide said first and second holding members along said axis of travel while remaining generally parallel with each other.

12. A jig according to claim 1, wherein said guide includes a plurality of guide bores.

13. A jig for center a drill according to claim 1, said guide having a second passage extending generally orthogonal to said first passage and extending to said first passage, said jig further comprising a second threaded rod extending into said second passage of said guide, said second threaded rod adapted to engage the first threaded rod to permit rotational movement of said first threaded rod in said guide but to restrict said first threaded rod from transverse movement therethrough.

14. A jig according to claim 1, wherein said fastener is a threaded fastener, said threaded rod includes a camming surface, said collar includes a rod receiving bore, said rod receiving bore of said collar includes a camming surface cooperating with said camming surface of said threaded rod such that when said threaded fastener is tightened said camming surface of said collar engages said camnming surface of said threaded rod to align said collar on said threaded rod.

15. A jig according to claim 14, wherein said threaded rod includes an annular recess, said second threaded rod engaging said annular recess thereby restricting said first threaded rod from transverse movement through said guide.

16. A jig according to claim 15, wherein said guide includes a cooperating structure engaging said annular recess when said threaded rod is inserted into said transverse passage of said guide member, whereby said cooperating structure permits rotational movement of said rod member but limits translational movement through said guide member.

17. A centering device for a jig, the jig including first and second clamping jaws, each clamping jaw having a bore aligned along an axis of travel, a guide member interposed between the first and second clamping jaws, the guide member having at least one guide hole, a centering device receiving bore aligned along the axis of travel, and a threaded pin for to selectively extending into the centering device receiving bore, said centering device comprising:

each said clamping jaw bore being a threaded bore;

a rod having a threaded portion adapted to engage the threaded bore of the first clamping jaw and to adjust the position of the first clamping jaw along said centering device, said threaded portion having threads spaced along said rod at a first spacing; an annular recess being adapted to cooperate with the threaded pin and to restrict the longitudinal movement of said centering device through the guide member, and a shaft portion; and a collar having a bore receiving said shaft portion and an enlarged distal end, said collar releasably coupling to said rod and having a threaded portion with a plurality of threads spaced along said collar at said first spacing and being adapted to engage the threaded bore of the second clamping jaw and to adjust the position of the second clamping jaw along said centering device with respect to the guide member, wherein one of said rod and said collar includes right hand threads and the other of said rod and said collar includes left hand threads, such that when said rod is rotated said rod is adapted to move the first and second clamping jaws generally simultaneously toward or away from each other along said rod, and said enlarged distal end providing a stop to limit movement of one of the first and second clamping jaws along said collar.

18. A centering device for a jig according to claim 17, wherein said shaft receiving bore includes an alignment surface, and said shaft portion including an alignment surface cooperating with said alignment surface of said rod receiving bore to align said collar on said rod when said collar is coupled to said rod.

19. A centering device for a jig according to claim 18, further comprising a fastener, said fastener extending into said shaft receiving bore and into said rod and coupling said collar to said rod.

20. A centering device according to claim 19, wherein said shaft receiving bore of said collar includes shoulder, said fastener engaging said shoulder and said collar to said rod.

21. A centering device according to claim 17, wherein said collar includes a stop for abutting the second clamp jaw to limit translation of the second holding member along said centering device.

22. A centering device according to claim 21, wherein said stop comprises a nut.

* * * * *

UNITED STATES PATENT AND TRADEMARK OFFICE
CERTIFICATE OF CORRECTION

PATENT NO. : 5,782,006
DATED : July 21, 1998
INVENTOR(S) : Parker Erway et al

It is certified that error appears in the above-identified patent and that said Letters Patent is hereby corrected as shown below:

Column 5, line 33:

Please delete "alien" and insert in lieu thereof --allen--.

Column 8, Claim 1, line 22:

Please delete "rotatable" and insert in lieu thereof --rotatably--.

Column 8, Claim 1, line 25:

Please insert --of-- between "other" and "said".

Column 8, Claim 7, line 60:

Please delete "where in" and insert in lieu thereof --wherein--.

UNITED STATES PATENT AND TRADEMARK OFFICE
CERTIFICATE OF CORRECTION

PATENT NO. : 5,782,006

DATED : July 21, 1998

INVENTOR(S) : Parker Erway et al

It is certified that error appears in the above-identified patent and that said Letters Patent is hereby corrected as shown below:

Column 9, Claim 13, line 30:

Please delete "center" and insert in lieu thereof --centering--.

Column 10, Claim 17, line 15:

Please delete ";" and insert in lieu thereof --,--.

Signed and Sealed this

Eighteenth Day of July, 2000

*Attest:*

Q. TODD DICKINSON

*Attesting Officer*    Director of Patents and Trademarks